US012759870B2

(12) United States Patent
Saso

(10) Patent No.: US 12,759,870 B2
(45) Date of Patent: Oct. 13, 2026

(54) HYDROGEN SUPPLY SYSTEM FOR GENERATING A HYDROGEN GAS FROM AN ELECTROLYTE WATER BY WATER SPLITTING

(71) Applicants: CROSS TECHNOLOGY LABO CO., LTD., Fukushima (JP); Mitsuhiro Saso, Hyogo (JP)

(72) Inventor: Mitsuhiro Saso, Hyogo (JP)

(73) Assignee: CROSS TECHNOLOGY LABO CO., LTD., Aizuwakamatsu (JP)

( * ) Notice: Subject to any disclaimer, the term of this patent is extended or adjusted under 35 U.S.C. 154(b) by 0 days.

(21) Appl. No.: 17/706,999

(22) Filed: Mar. 29, 2022

(65) Prior Publication Data

US 2023/0313387 A1 Oct. 5, 2023

(51) Int. Cl.
*C01B 3/08* (2026.01)
*C01B 32/198* (2017.01)
(Continued)

(52) U.S. Cl.
CPC .............. *C01B 3/08* (2013.01); *C01B 32/198* (2017.08); *C01B 32/225* (2017.08); *C01B 32/23* (2017.08)

(58) Field of Classification Search
CPC .... C25B 1/04; C25B 1/02; C25B 1/50; C25B 11/043; C22C 9/01; C22C 9/04;
(Continued)

(56) References Cited

U.S. PATENT DOCUMENTS 3,957,483 A * 5/1976 Suzuki ...................... C01B 3/10 423/657
6,638,493 B2 * 10/2003 Andersen .................. B01J 7/02 423/657
(Continued)

FOREIGN PATENT DOCUMENTS

CN 110065927 A * 7/2019 ............... C01B 3/08
EP 3312138 A1 * 4/2018 ............... C01B 3/08
(Continued)

OTHER PUBLICATIONS

Paul et al. "Vibrational Coupling between Ethylidyne Species on Platinum Particles" J. Am. Chem. Soc. 1992, 114, 1949-54 (Year: 1992).*
(Continued)

*Primary Examiner* — Luan V Van
*Assistant Examiner* — Alexander R. Parent
(74) *Attorney, Agent, or Firm* — Birch, Stewart, Kolasch & Birch, LLP

(57) ABSTRACT

This is a system for generating and supplying a hydrogen gas from water by water splitting using a carbon electrode containing ethylidyne without any external electric power, which system comprises A) a carbon electrode containing ethylidyne, B) an alkaline electrolyte water solution and C) a metal electrode selected from group consisting of a typical metal including zinc, aluminum and magnesium and a transition metal including copper, wherein the carbon electrode containing ethylidyne and the metal electrode are brought into contact with or opposed to each other in the alkaline electrolyte water solution, and the water is decomposed by the effect of ethylidyne to generate a hydrogen gas.

3 Claims, 20 Drawing Sheets

(51) Int. Cl.
*C01B 32/225* (2017.01)
*C01B 32/23* (2017.01)

(58) Field of Classification Search
CPC C01B 3/08; C01B 3/042; C01B 3/061; C01B 32/198; C01B 32/225; C01B 32/23
USPC .......................................................... 423/657
See application file for complete search history.

(56) References Cited

U.S. PATENT DOCUMENTS

| | | | | |
|---|---|---|---|---|
| 10,407,303 B2 * | 9/2019 | Mauvy | C01B 3/065 | |
| 2014/0154173 A1 * | 6/2014 | Phillips | C01B 3/08 | 423/657 |
| 2020/0231446 A1 * | 7/2020 | Grosz | C01B 32/23 | |

FOREIGN PATENT DOCUMENTS

| | | | | |
|---|---|---|---|---|
| JP | 2018023940 A | 2/2018 | | |
| WO | WO-2009034479 A2 * | 3/2009 | | C01B 3/08 |

OTHER PUBLICATIONS

Hou and Bayes "Formation and Reactions of Ethylidyne" J. Phys. Chem 1994, 98, 6324-26 (Year: 1994).*

Lee and Wright "Methylcarbyne Radical [CH3C(X̃2A;ã 4A2)] and the Chemiionization Reaction: CH3C+O CH3CO+ + e−" J. Phys. Chem. A 1999, 103, 721-726 (Year: 1999).*

Bogoslavsky et al. "Do Carbyne Radicals Really Exist in Aqueous Solution?" Angew. Chim. Int. Ed. 2012, 51, 90-94 (Year: 2012).*

Goldsmith et al. "Database of Small Molecule Thermochemistry for Combustion" J. Phys. Chem. A 2012, 116, 9033-9057 (Year: 2012).*

Chen "Why the Reactive Oxygen Species of the Fenton Reaction Switches from Oxoiron(IV) Species to Hydroxyl Radical in Phosphate Buffer Solutions? A Computational Rationale" ACS Omega 2019, 4, 9, 14105-14113 (Year: 2019).*

Lazar et al. "The nature of high surface energy sites in graphene and graphite." Carbon 73 (2014) 448-453 and S1-S16 (Year: 2014).*

Wang et al. "The role of sp2/sp3 hybrid carbon regulation in the nonlinear optical properties of graphene oxide materials†" RSC Adv., 2017, 7, 53643 and SI (Year: 2017).*

Cross Technology Lab Co., Ltd. "Specialty Carbon Decomposes Water to Hydrogen and Oxygen—Successful Development of New Specialty Carbon to Produce Clean Energy from Water" Sashimi Light (2018) (Year: 2018).*

VWR "Sodium hydroxide solution 50% (w/w) ~ 12.5 N in aqueous solution, Reagent grade" web accessed May 4, 2024 (Year: 2024).*

Ganguly et al. "Probing the Thermal Deoxygenation of Graphene Oxide Using High-Resolution In Situ X-ray-Based Spectroscopies." J. Phys. Chem. C 2011, 115, 17009-17019 (Year: 2011).*

Bartali et al. "Efficient hydrogen generation from water using nanocomposite flakes based on graphene and magnesium†" Sustainable Energy Fuels, 2018, 2, 2516 and SI (Year: 2018).*

Ma et al. "Promoting hydrogen generation from the hydrolysis of Mg-Graphite composites by plasma-assisted milling" Energy 167 (2019) 1205-1211 (Year: 2019).*

Faye et al. "Experimental and theoretical studies of hydrogen generation by binary metal (oxide)-graphene oxide composite materials" International Journal of Hydrogen Energy 46 (2021) 19802-19813 (Year: 2021).*

"Enhanced hydrogen generation from graphite-mixed aluminum hydroxides catalyzed Al/water reaction" International Journal of Hydrogen Energy 45 (2020) 33419-33429 (Year: 2020).*

Cross Technology Lab Co., Ltd., "Specialty Carbon Decomposes Water to Hydrogen and Oxygen—Successful Development of New Specialty Carbon to Produce Clean Energy from Water" Sashimi Light, Aug. 3, 2018.

Tsuji et al. "Near-Infrared Light-Driven Hydrogen Evolution from Water Using a Polypyridyl Triruthenium Photosensitizer", Angewandte Chemie International Edition 2018, 57, 208-212.

Tan et al., "Electrocatalysis: Splitting Water Without Breaking the Bank", Energy & Environmental Science 9, 2257-2261, Dec. 26, 2016.

Kyoungsuk et al., "Mechanistic Investigation of Water Oxidation Catalyzed by Uniform, Assembled MnO Nanoparticles", Journal of American Chem. Soc. 2017, 139, 6, 2277-2285, Dec. 28, 2016.

* cited by examiner

Formula of flight time $$t = \frac{\sqrt{2mL}}{\sqrt{E_K} + \sqrt{E_K + qV_S}}$$

Ion flight time : t m: Mass L : Flight length $E_k$ : Ion kinetic energy q : Charge Vs : Sample voltage Case of electrons being pulled out of oxygen (ionic model)
Electric potential generation mechanism by University of Tsukuba ① Sample :A ② Sample : B ③ Sample :C

HYDROGEN SUPPLY SYSTEM FOR GENERATING A HYDROGEN GAS FROM AN ELECTROLYTE WATER BY WATER SPLITTING

TECHNICAL FIELD

The present invention relates to a hydrogen supply system for generating a hydrogen gas from an electrolyte water by water splitting.

STATEMENT REGARDING PRIOR DISCLOSURES BY THE INVENTOR OR A JOINT INVENTOR UNDER 37 C.F.R. 1.77(b)(6)

The hydrogen supply system of the present invention was published on Nov. 18, 2021 by Japanese Patent Application Publication No. 2021-178754. The disclosure was made by Mitsuhiro Saso who is the same inventor of this application. A copy of a print out of the Japanese Patent Application Publication is provided on a concurrently filed Information Disclosure Statement pursuant to the guidance of 78 Fed. Reg. 11076 (Feb. 14, 2013).

BACKGROUND OF THE INVENTION

If a hydrogen gas could be made by water splitting or water decomposition in spite of hydrocarbon decomposition, a preferable global environment can be realized without pollution. Therefore, a photo-hydrolysis system using solar light energy as the water decomposition energy source has been proposed. One of them is a method for using photo-semiconductor electrodes, and a method for using a titanium oxide TiO2 has been known as the Honda-Fujishima effect in the world. However, since the utilization rate of visible light energy as sunlight is still low, there has been proposed a method of utilizing a semiconductor layer having an absorption wavelength longer than 450 nm and a reflection increasing layer selected from the group consisting of Ag or Al in contact with the semiconductor layer (Patent Document 1). On the other hand, it has been published that a metal complex comprising 3 ruthenium centers in a molecule is adopted as a light collecting molecule, and a hydrogen generation reaction using near infrared light has been successfully performed (Non-Patent Document 1). In this method of using solar energy, since the system uses various metals such as platinum and a photocatalytic semiconductor, it is not only expensive, but also troublesome in that respect of the effectiveness only during the daytime.

Further, many attentions have been paid to the four electron reduction reaction of water due to photosynthesis as a water decomposition catalyst without using sunlight energy, and an alloying catalyst of Fe-Cobalt Phosphorus compound (Non-Patent Document 2) and an artificial manganese catalyst (Non-Patent Document 3) have been proposed.

PRIOR ART DOCUMENTS

Patent Document

[Patent Document 1] JP 2018-23940 publication

Non-Patent Document

[Non-Patent Document 1] Published on October 16, Angewandte ChemieInternational Edition 2017

[Non-Patent Document 2] Published on December 26, Nature 2016: Assistant Tan, Tohoku University

[Non-Patent Document 3] Published January 17, Journal of the American chemical society 2017: RIKEN Nakamura et al.

SUMMARY OF THE INVENTION

Problem to be Solved by the Invention

Incidentally, although many photocatalysts and water decomposition catalysts have been proposed, it is a problem that there is no mass productivity except for Titanium Oxide, so that it is far from practical use as an non-expensive and large-scale hydrogen production method. It is therefore an object of the present invention to provide an inexpensive new hydrogen supply system capable of performing water decomposition or water splitting in order to realize a hydrogen gas generation at low cost without using solar energy or external electric power.

Means for Solving the Problems

Although various carbon electrodes are provided for many applications, it has not been found the following phenomenon:

When some carbon electrodes are immersed in an electrolyte water solution as an electrode material, we found that a hydrogen gas can be generated from water. We believe that, some active materials may be released from the carbon electrode into water and it is effective for water splitting without any external electric power, and also a hydrogen gas can be also generated from a metal surface (FIGS. 2A and 2B). Therefore, we tried to confirm that some hydrocarbon-based active materials are released from carbon electrode by chromatography and confirmed by means of TOF-ESD (time-of-flight electron-excited ion desorption) microscopy. As a result of intensive scrutiny, we have found and confirmed that this hydrocarbon-based active material was a carbyne chemical species ethylidyne deposited on a platinum catalyst surface during a hydrogenation reaction of ethylene which was founded by Prof. Dr. Gabor A. Somorjai in California Univ., and further promotes water splitting. On the basis of this foundation, we finally invented a system for generating and supplying a hydrogen gas from water without any external electric power and sunlight.

The present invention relates to a system for generating and supplying a hydrogen gas which comprises A) a carbon electrode containing ethylidyne and B) a metal electrode to be ionized in an electrolyte water solution, wherein both electrodes are opposed or brought into contact with each other in the electrolyte water solution, and a hydrogen gas is generated by the interaction of ethylidyne between the metal electrode and the carbon electrode.

In an embodiment of the present invention, we found that our carbon electrode contains ethylidyne and can be preferably manufactured from graphite. On the other hand, the metal electrode needs to be a source of electrons by ionization in the electrolytic bath, so that a typical metal such as Al, Zn and Mg having a high ionization tendency can be selected, but from the cooperative action with ethylidyne a transition metal such as Cu may be selected. The electrolyte may be acidic or alkaline solution, but it was also found that the alkaline electrolyte is preferred made, which is made by addition of 5-30% by volume, preferably 15-20% by volume, of a 50% caustic soda solution to water or brine. According to the other embodiment, it is also found that a seawater is preferable because it has a concentration at which the generation of chlorine can be suppressed. Instead of the seawater, a salt water of 1 M or more of sodium chloride may be used for this inventive electrolyte solution.

Effect of the Invention

According to another embodiment of the present invention, it is found that a layer-separated and inflated graphite layer in a carbon electrode sometimes contains ethylidyne or a carbon structure for making ethylidyne, which ethylidyne is representative of carbyne radicals, and when a copper electrode is used as a counter electrode against the carbon electrode in water, it starts at first with a mild or quiet generation of hydrogen from the carbon electrode side (FIG. 2A), but since the carbon electrode releases ethylidyne into water, it starts violently water decomposition when it comes into contact with the copper electrode on the counter electrode, and produces a gas containing hydrogen (FIG. 2B). As a result, it is considered that ethylidyne exudation into the electrolytic water solution from the carbon electrode and formation of metal ions from the metal electrode are involved in hydrogen gas generation as follows. The ethylidyne $CH_3C$ (having triplet unpaired electrons) reacts with oxygen in water, as shown in the following reaction.

$CH_3C+O\rightarrow CH_3CO^{+}+e^{-}$, and thereafter in response to $H_2O$, resulting in generation of hydrogen gases: $CH_3CO_{+}+e+H_2O\rightarrow CH_3COOH+H_2\uparrow$ In addition, metals react with ethylidyne in water and form a complex of $CH_3CMe+e^{-}$, and in response to $H_2O$, the following reaction occurs: $CH_3CMe^{+}+e+H_2O\rightarrow CH_3COMe+H_2\uparrow$ Then, it is expected that the intermediate $CH_3CO^{+}$ and $CH_3CMe^{+}$ are reduced by receiving electrons by forming the metal ions from the metal and reduced to ethilidyne through the intermediate. Such a process could be expected to repeat until the metal disappears as an ion.

On the other hand, the following phenomena in the nano-space in the carbon electrode containing ethylidyne are also considered to be involved (FIG. 8). When a metal-ion Me' (n is larger than 1 and integer) enters into the nano-spaces of graphite inter-layers, it enters into the graphite layers, resulting in forming a microcell by the contact potential difference between the metal ion electrode and the graphite layer electrode, and also the resulting electromotive force (electric charge) is accumulated in the micro-capacitor made with the graphite layer spacing adjacent to the microcell. When the microcell generates hydrogen gas in the nano-space due to this electromotive force, the pressure rises rapidly in the nano-space due to the minute capacity V, and the temperature in the nano-space rises rapidly, and the boiling phenomenon happens according to the gas state equation of PV=nRT. It is considered that this is the cause of boiling of the electrolytic cell in the present hydrogen supply system. And, in the micro-capacitor, when the storage charge capacity increases, the metal may be evaporated by the electric field, and it moves and adheres to the adjacent graphite layer, and it seems to cause a state in which the microcell moves to the next space. It can be thought that this would be a cause of the phenomenon in which the hydrogen generation position at the carbon electrode changes sequentially The carbon electrode used in the present invention is preferably made of a graphite material. This is because graphite undergoes rapid thermal decomposition at a high temperature, and expands between graphite layers in a direction perpendicular to the layer plane (hexagonal net plane) by the gasification pressure of the product accompanied by the decomposition to become bulky expanded graphite (it is well known to the skill in the art that graphite mainly comprises a sp2 carbon structure but sometimes comprises a sp3 carbon structure). In addition, if the carbon electrode would be an interlayer compound used as a positive electrode or an air electrode in which ethylidyne acts, it can be considered that metal ions penetrate into the interlayer compound and constitute a microcell because of a difference in contact potential between the metal layer and the carbon layer serving as a counter electrode, and also a micro-capacitor may be formed between the microcell and the carbon layer adjacent thereto (FIG. 8).

The inflated carbon electrode is preferable because the ion insertion capacity of the interlayer compound can be increased and the battery capacity can be increased by expanding the layers of the carbon electrode, so that the layer interval should be uniformly expanded. In the present invention, it is believed that the following events in the nano-space within the carbon electrode are involved, as well as the formation of the Hydrogen gases by the following reaction of ethylidyne $CH_3C+O\rightarrow CH_3CO^{+}+e^{-}$, and $CH_3CO^{+}+e^{-}+H_2O\rightarrow CH_3COOH+H_2\uparrow$ When the metal ion $Me^{n+}$ penetrates into the nano-space of the graphite interlayer compound, the metal ion adheres to the graphite layer and forms a microcell by a contacting potential difference with the counter electrode. The electromotive force will be accumulated in the micro-capacitor with the graphite layer spacing adjacent to the microcell, but when the microcell generates hydrogen gas in the nano-space with this electromotive force, the pressure will rise sharply in the nano-space with the minute capacity V, and the temperature in the nano-space will rise sharply, and the boiling phenomenon will occur. The cause of the fever is considered to be based on the phenomenon here. And, in the micro-capacitor, when the storage capacity increases, the metal is evaporated by the electric field, and it moves and adheres to the adjacent graphite layer, and it seems to cause the outcome in which the microcell moves.

Mass Spectrometry of Ions in Carbon Electrodes

Mass-spectrometry was performed using a detecting microscope of ions using electron-excited ion desorption from a sample by a hydrogen microscope at the Second-floor TF Engineering Laboratories of the Keihanna Plaza Laboratory, Kyoto Prefecture, Japan (time-of-flight electron-excited ion desorption method: TOF-ESD method). Here, hydrogen microscopy is said to be Scanning type Electron-Stimulated Desorption Ion Microscope (SESDIK). As shown in FIG. 3, when a sample is irradiated with a pulsed electron at a low speed of 100 to 500 eV, hydrogen, oxygen, and other species adsorbed on the solid surface are ionized and pop out into the vacuum. These are detected and amplified into a signal. Since the electron beam is irradiated as a pulse, it is calculated by the time-of-flight method (TOF) for detection of ions using the calculation formula of the time-of-flight. When this signal is displayed as a TOF spectrum, mass spectrometry corresponding to a local field can be performed, and a two-dimensional distribution of ions of hydrogen, oxygen, and other adsorbed species can be obtained. Not only can hydrogen and oxygen be detected, but also differences in binding and adsorption states are projected onto the kinetic energy of desorption to sort and detect adsorption patients for chemical mass spectrometry.

Ion Mass Spectrometry in Carbon Electrodes

An unused carbon electrode and a carbon electrode after water electrolysis are set in a sample holder with a heater for heating for hydrogen analysis with dimensions of 10 mm×8 mm. Examples of measurements are shown in FIGS. 5A and 5B.

FIG. 5A shows the temperature rise and desorption spectra of impurities discharged from surfaces into vacuum by heating the sample (the unused carbon electrode) to 200° C. FIG. 5B shows the temperature rise and desorption spectra of impurities released from surfaces into vacuum when heated to a sample (the carbon electrode after water electrolysis) to 290° C. The right-hand bar graph shows the final emission of the respective masses, and the left-hand side shows the temperature rise. FIG. 5A shows a state of the temperature rising up to 200° C. while FIG. 5B shows a state of the temperature saturated once at 200° C., and a state of the temperature raised up to 290° C. to stop heating and cool down in the peak-time period. In FIGS. 6A, B, and C, there are shown a state of the temperature rise to 290° C. and a state of the temperature repeated six times at intervals, wherein the conditions of the third, fourth, and sixth times are shown.

The emission gas (for 4 minutes) from the sample at the third measurement is not much different from the second measurement (one hour ago) which is shown in FIG. 6A, and FIG. 6B shows the fourth measurement wherein the ion pump is turned on and turned off for a while in order to display the final values in an easy-to-understand manner. FIG. 6C shows an outgassing state from the sample at the sixth measurement. From the above results, our attention should be paid to the spectra of impurities having masses of 27 and 28, and it can be seen from the measurement data that both ethylidyne and ethylene are released from the sample.

EMBODIMENT FOR CARRYING OUT THE INVENTION

Production of Carbon Electrodes Containing Ethylidyne

Figure 10:
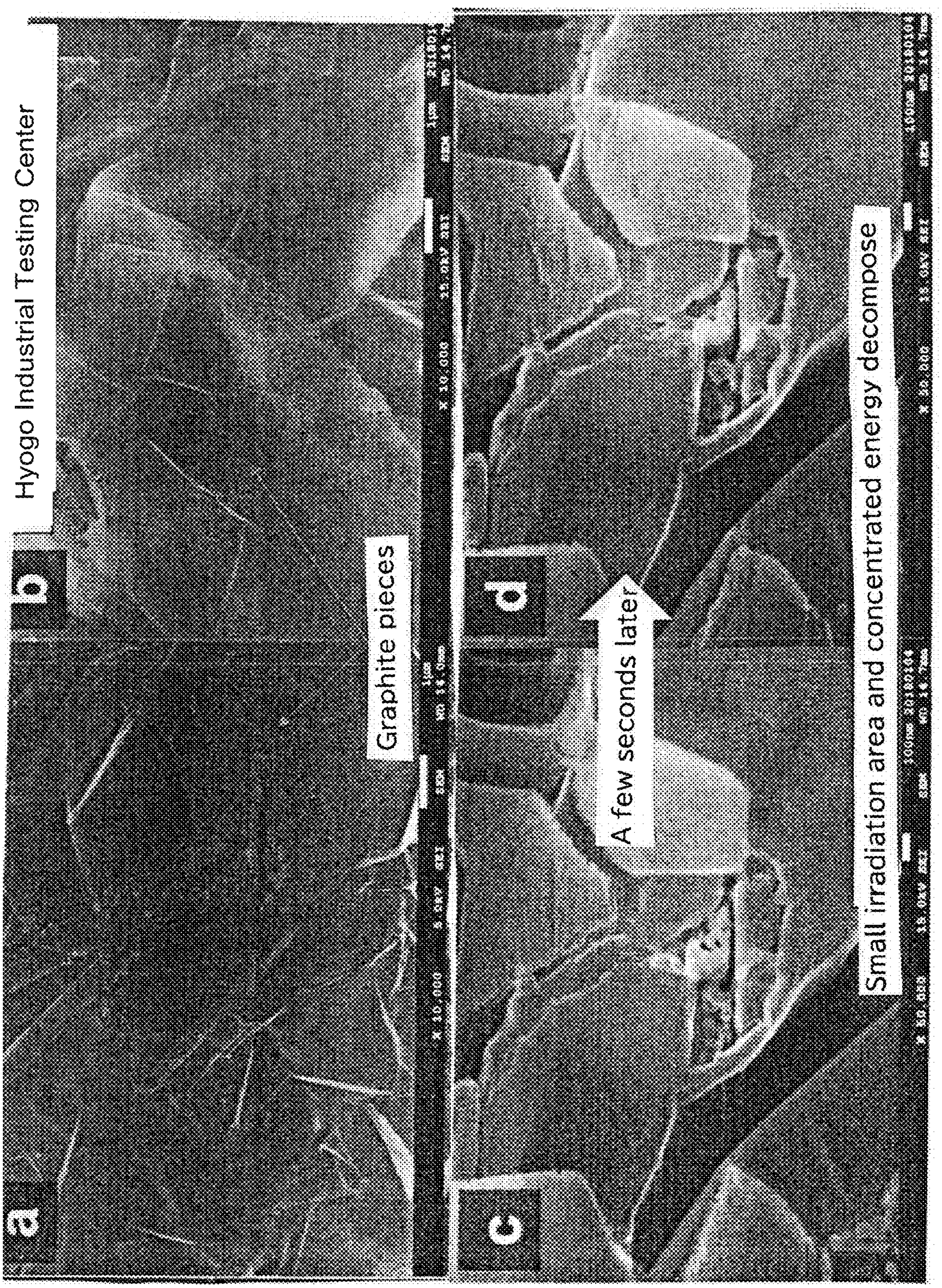
FIG. 10 shows photomicrographs (a), (b), (c) and (d) of a carbon electrode hydrogen-occluded by water electrolysis process.

As shown in FIG. 10, in the carbon electrode according to the present invention, it is necessary to constitute a microcell with a graphite layer serving as a counter electrode by penetration of metal ions and to constitute a micro capacitor between adjacent graphite layers in the carbon electrode. Therefore, the graphite sheet is immersed in water or the like overnight and expanded by flame heating of a burner or the like. To facilitate flame expansion, immersion solutions are prepared by dissolving 50 ml concentrated nitric acid, 0.5-1.0 mol glucose, NaCl; 1.0-1.5 mol in 1 liter water.

When the carbon electrode produced by the following method is immersed in 1 mol of saline solution and allowed to stand for about 30 seconds, generation of fine bubbles from the entire surface of the carbon electrode, particularly from the side surface, is gradually recognized. Large amounts of hydrocarbons were confirmed when exudates from carbon sheets into solution by means of the chromatography. Therefore, when a section of the above-mentioned expanded carbon sheet was cut out and analyzed by using a method of detecting protons which are desorbed by irradiating pulsed electrons on the surface of a solid (electron excitation and desorption, TOF-ESD) at the Keihanna Laboratory Building TF Engineering Laboratory, ethylidyne ($CH_3C$) having a molecular weight of 27 and ethylene ($C_2H_4$) having a molecular weight of 28 were detected in addition to hydrogen, oxygen, and carbon monoxide. When this ethylidyne is released into water, it is supposed that water molecules are separated into hydrogen ions and hydroxide ions, and hydrogen ions are reduced to generate hydrogen gas. In addition, it is supposed that it forms an ethylidyne metal complex when it is combined with a metal ion, which have a function as a water decomposition catalyst. The metal is not only selected from the group consisting a typical metal such as Al, Zn or Fe, but also a transition metal such as Cu.

Next, a copper plate (1 mm thickness, 5×15 cm) and a carbon electrode of the present invention are bonded together using a ring rubber or the like, or are placed opposite to each other and immersed in 1 mol of saline.

First, generation of hydrogen is observed from the carbon electrode, and thereafter, generation of hydrogen is also observed from the copper plate (FIG. 2A), and generation of hydrogen gas from the copper plate is observed even when the carbon electrode is desorbed from the saline solution. When the aluminum plate is immersed in this solution, hydrogen gas is also generated from the aluminum plate (2B in FIG.). It is presumed that the generation of hydrogen from the copper plate and the generation of hydrogen from the aluminum plate are the water decomposition effect of the ethylidyne copper complex formed between the copper plate and the aluminum plate. More specifically, if water is decomposed, as shown in FIG. 1. Hydrogen-evolving reaction is shown as $$4H^+ + 2e^- \rightarrow 2H_2,$$

This phenomenon is somewhat complicated, but it is as follows. In other words, a pair of the carbon electrode and the metal electrode are put into the electrolytic solution.

Figure 8:
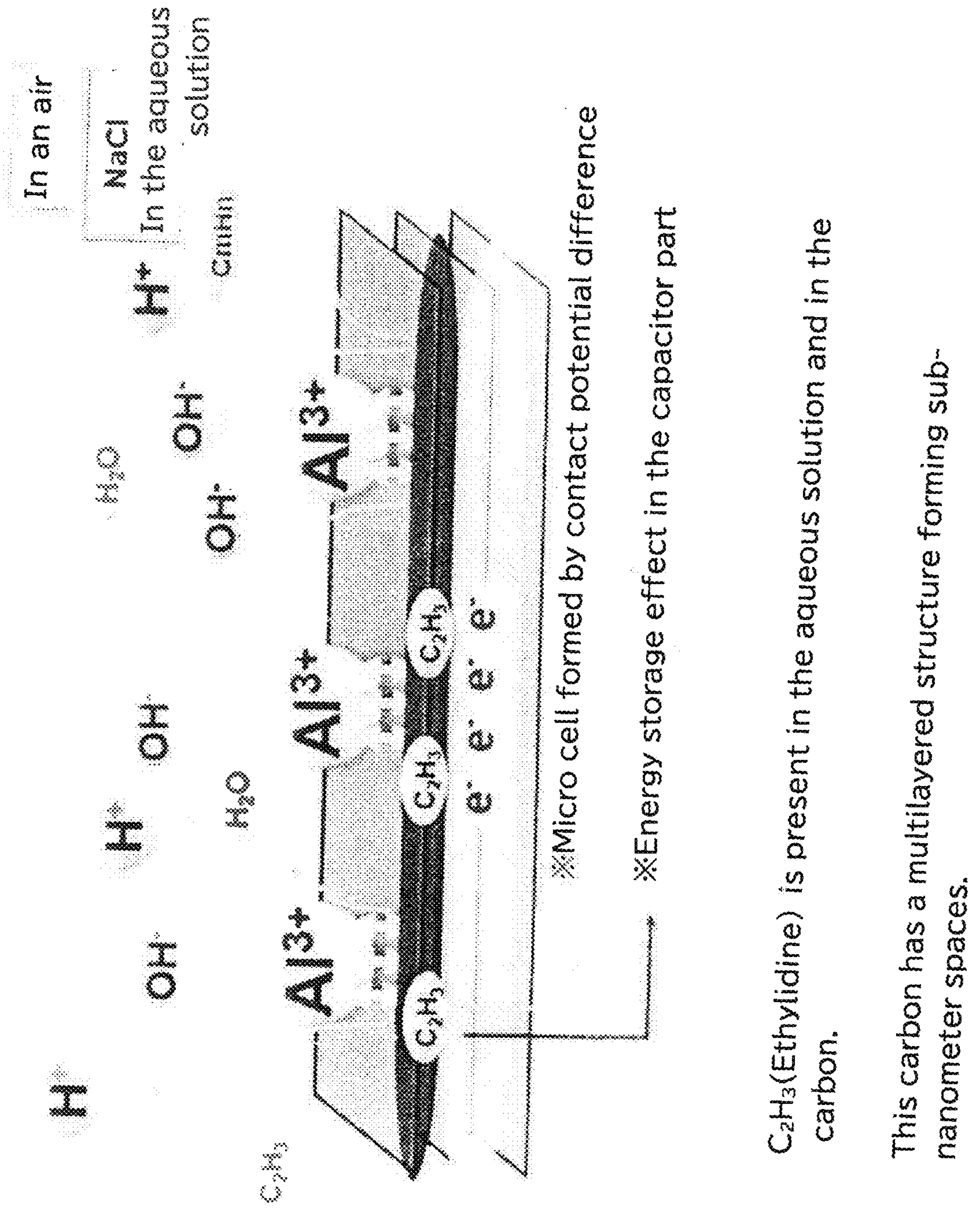
FIG. 8 is a conceptual diagram of a microcell and microcapacitor metal ions are formed in the swelled FGS.
Figure 9:
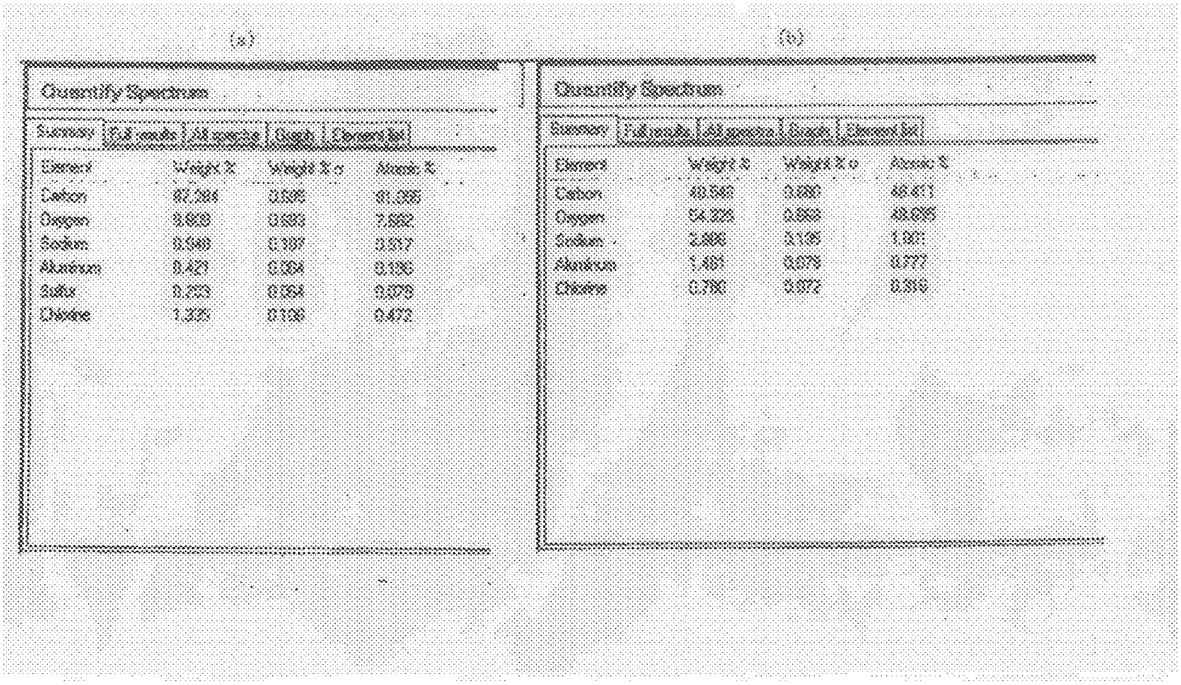
FIG. 9 is an EDS elemental component table of a carbon electrode obtained by electrolysis in saline.

Between the electrode materials subjected to the chemical reaction, there is the release of metal ions from the metal electrode, while there is the release of ethylidyne from the carbon electrode in the electrolytic solution. Therefore, on the metal side, the composition of the ethylidyne metal complex can be made by the adhesion of ethylidyne to the metal electrode. On the other hand, on the carbon material side, due to a difference in contact potential between a portion of carbon layer coated with metal ions and another carbon layer serving as a counter electrode a micro-cell can be made and an electric power effect is generated, whereby hydrogen is generated by electrolysis, and a capacitor portion has an electric storage action, which is cooperate with the micro-cell formed as shown in FIG. 8. Focusing on this carbon electrode portion, it is considered that the multilayer structure having a locally sub-nanometer space is formed, and the micro-cell structure in the nano-space in the surface layer portion is made and disappeared one after another, while the same cell action also occurs in the internal multilayer structure as described above, resulting in increasing generation of the electrolyzed hydrogen atom and the hydrogen molecule. Accordingly, it is considered that such a mechanism of electric power generation and a mechanism of hydrogen generation are understood as a phenomenon between the metal and the carbon. It is presumed that the ethylidyne or a metal complex thereof formed between the metal layer and the carbon layer can promote the above-mentioned electric power generation mechanism and the hydrogen generation mechanism by cooperation of the micro-cell and the micro-capacitor.

Reaction with Various Metals

When the carbon electrode of the present invention is immersed together with a copper plate in 1 molar saline solution, the carbon electrode exhibits a water decomposition action, and reacts violently with water to generate a large amount of hydrogen gas including vapor, and until the copper plate is decomposed into briquettes, the reaction proceeds. In addition, even if a zinc plate was used instead of the copper plate, the entire zinc plate became Zinc Oxide, and the water decomposition reaction became slow, but the reaction continues. In the case of aluminum plates, it was found to exhibit durability in saline and long-time hydrogen production capacity compared to copper and zinc. In particular, translucent crystals are formed around the carbon electrodes in the cell structure of the aluminum plate/1MNaCl+$H_2O_2$/the carbon electrodes. This crystal has a high oxygen content ratio and high conductivity, and forms a semi-solid electrolyte because aluminum hydroxide or sodium aluminate would contain ethylidyne. If the crystal electrolyte is interposed between aluminum/copper, zinc/copper, aluminum/carbon electrode, and carbon electrode/carbon electrode, the cell combination thereof can constitute a micro-cell and produce an electric power.

Preparation of Carbon Electrodes Containing Ethylidyne

In the method for producing a carbon electrode of the present invention, it is preferable that the electrode should be used as one or both of electrodes in an electrolyte solution. A water electrolysis reaction, or a electric power generation is necessary to improve the property of carbon electrode because such a process can make the carbon electrode to occlude hydrogen during electrolysis.

The step of separating and swelling the graphite layers is for separating the carbon electrode layers to have a specific gravity of 0.1 to 0.5 g/cm3. When the specific gravity is smaller than 0.1, the shape retention after swelling is poor, and when it is larger than 0.5, the interlayer separation after swelling is insufficient.

Concentrated nitric acid may be used as the oxidizing agent for the carbon electrode. This is because the catalytic function may be improved by pickling effect or oxidation action. In addition, the carbon electrode of the present invention can continue the catalytic function for a long period of time by mixing the radium ore powder having gamma ray radioactivity.

Microscopic Photograph of Electrode

Figure 11:
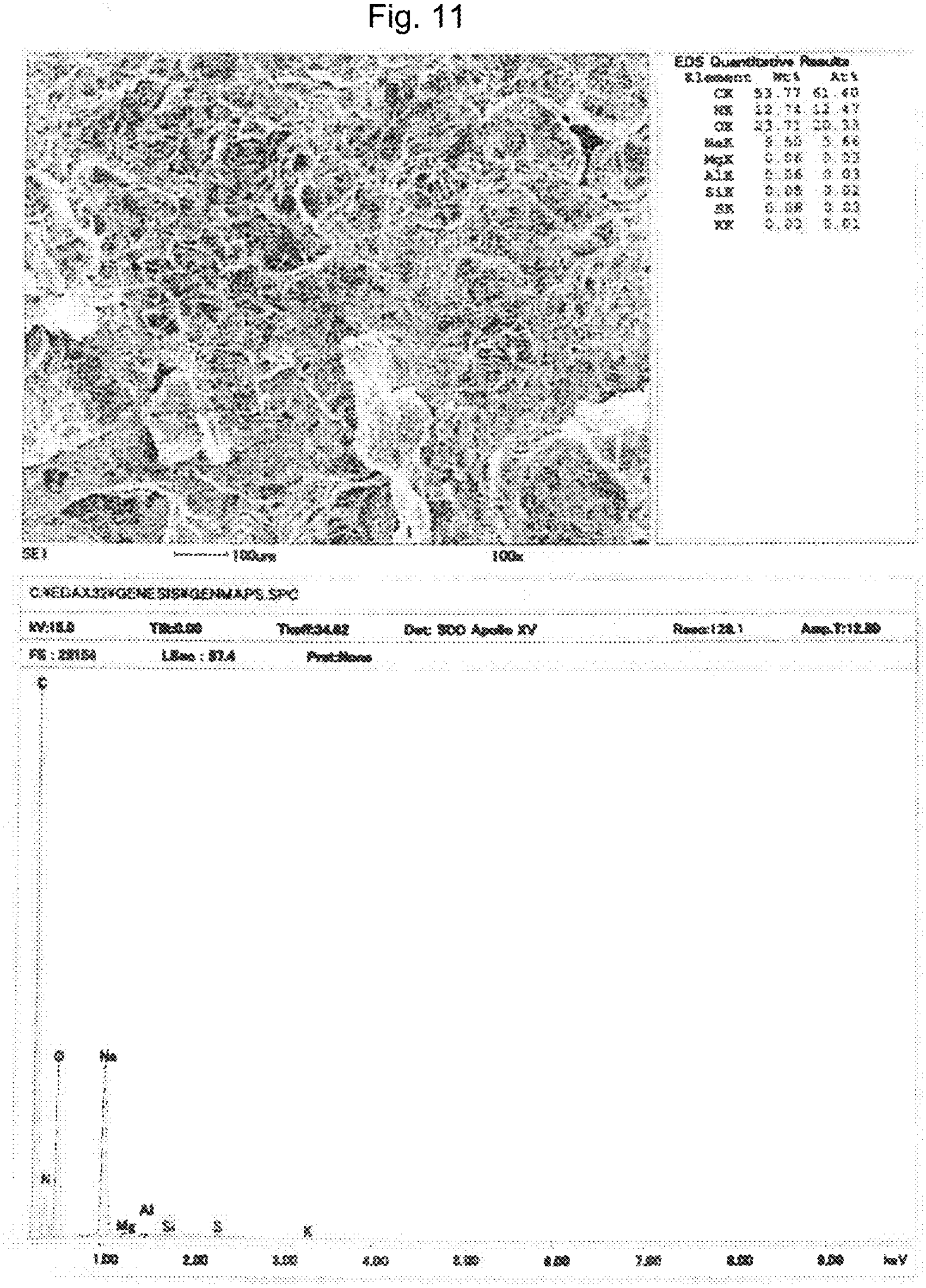
FIG. 11 is a photomicrograph and EDS elemental component table when a carbon electrode that has been hydrogen-occluded by a water splitting power generation treatment in brine is subjected to a swelling treatment.

FIGS. 10 (*a*) and (*b*) are SEM photographs at 10,000 times of a carbon electrode which has been swelled and oxidized after swelling. The oxidative graphite structure has a porous structure, the inside of which is cut into a triangular shape, and each layer exhibits translucency. FIGS. 10 (*c*) and (*d*) refer to the white-looking portion of the truncated tip, and it seems that Na+ is attached, and when the irradiation energy is concentrated, it shows a state of partial decomposition. As a result, flakes of graphite or graphene appear to accumulate. From the carbon-oxygen atom ratio shown in FIG. 11 between each layer, a structure in which an oxygen atom is bonded to each carbon atom (carbon-oxygen atom ratio is approximately 1 to 1) is shown. As a function of the structure, it is suggested that a new "carbon-oxygen" structure may be formed from the catalytic function for the redox reaction between peroxide and oxide in the positive electrode.

Figure 12A:
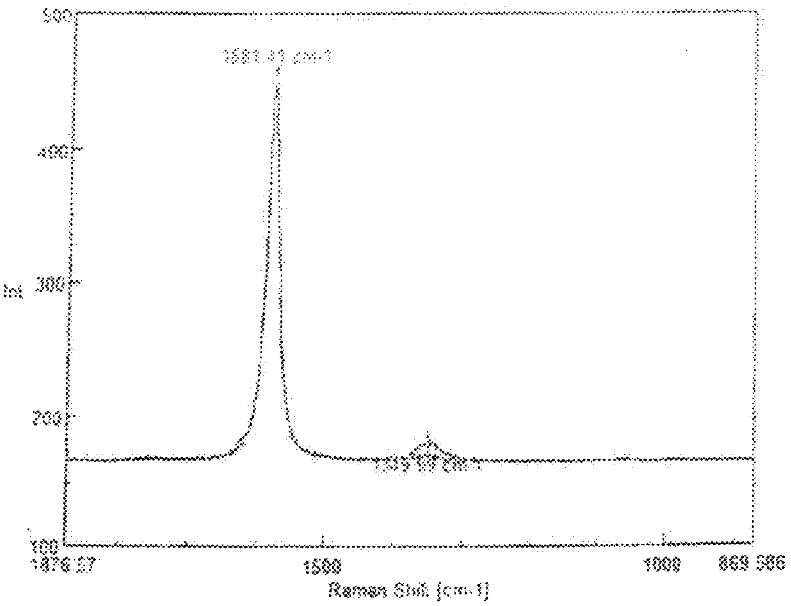
FIG. 12A is a graph showing a microscopic Raman spectrum of the carbon electrode before the swelling treatment (A).
Figure 12B:
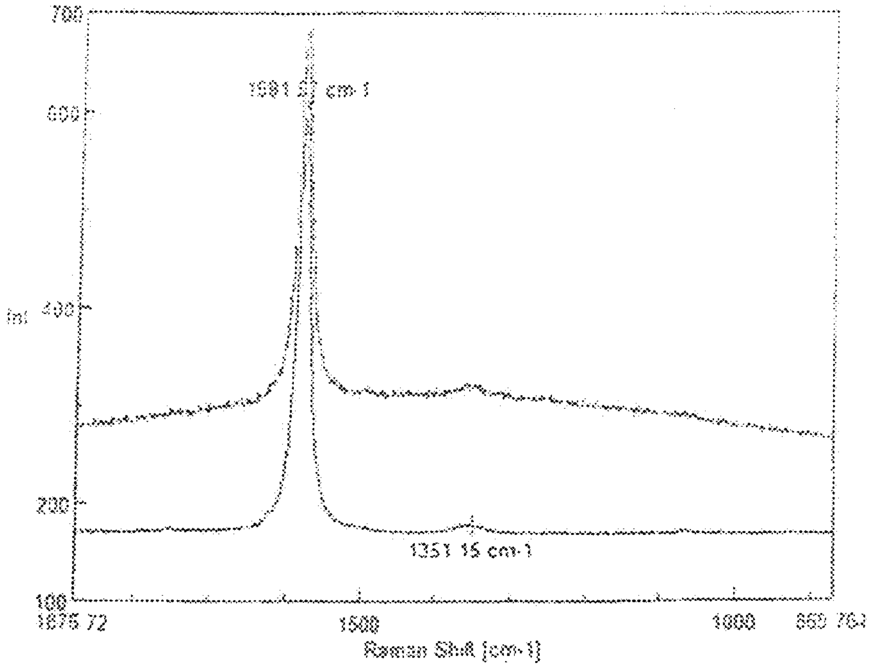
FIG. 12B is a graph showing a microscopic Raman spectrum of the carbon electrode after the swelling treatment (B).
Figure 12C:
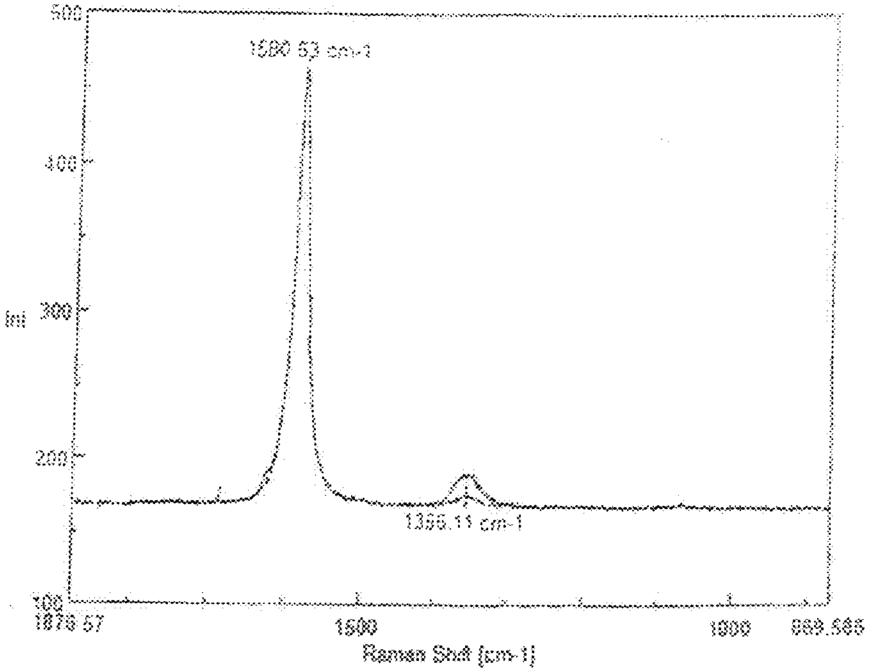
FIG. 12C is a graph showing a microscopic Raman spectrum of the carbon electrode after the concentrated nitric acid immersion treatment (C).

The microscopic Raman spectra of the carbon electrode A, the carbon electrode B and the carbon electrode C were measured by using a near-field optical microscope (NFS-230HKG) manufactured by Japan Spectroscopy Co., Ltd., wherein pumping wavelength: 532 nm, laser intensity: about 6.4 mW, slit width: diameter 100 μm, aperture: diameter 4000 μm, objective lens: ×20 (analytical diameter about 4 μm), exposure time×integrated number: 10 sec×2 times and the micro-Raman spectra of FIGS. 12A, B, C were obtained. Samples B and C were measured under the condition of peeling off the solid top from the sample. A change in the D-band of the sample from samples A to C are shown and the spectral peaks of Raman shift are moved from 1349.99 to 1356.11 $cm^{-1}$.

EXAMPLES

Figure 1A:
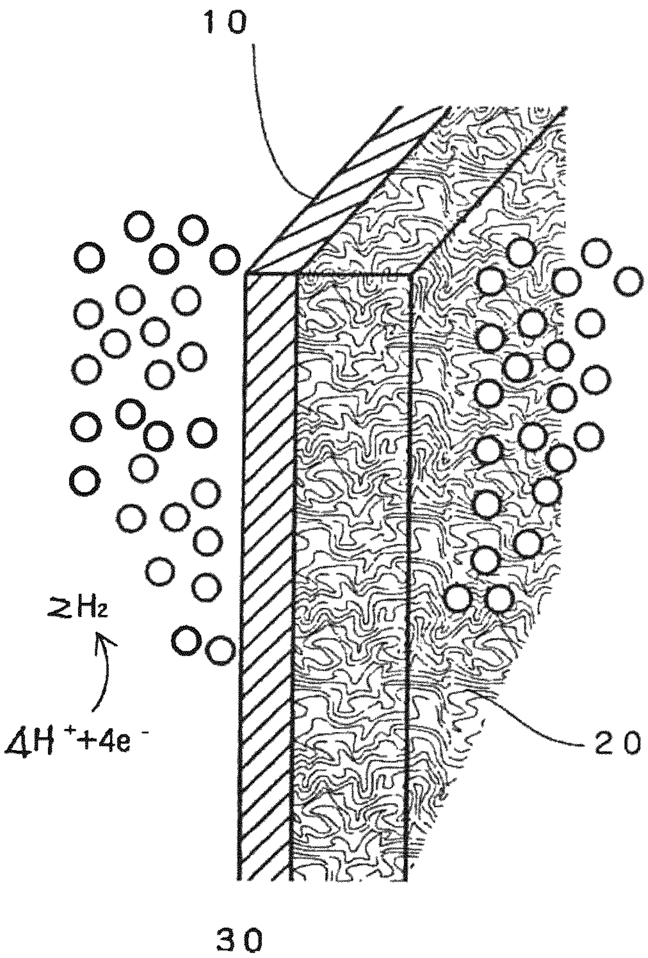
FIG. 1A is a schematic diagram of a hydrogen supply system according to the present invention, showing a state in which a 3 mm thick Al metal plate and a carbon electrode expanded to a thickness of 15 mm are combined and put into a saline solution to which 20% by volume of 50% caustic soda solution is added.
Figure 2A:
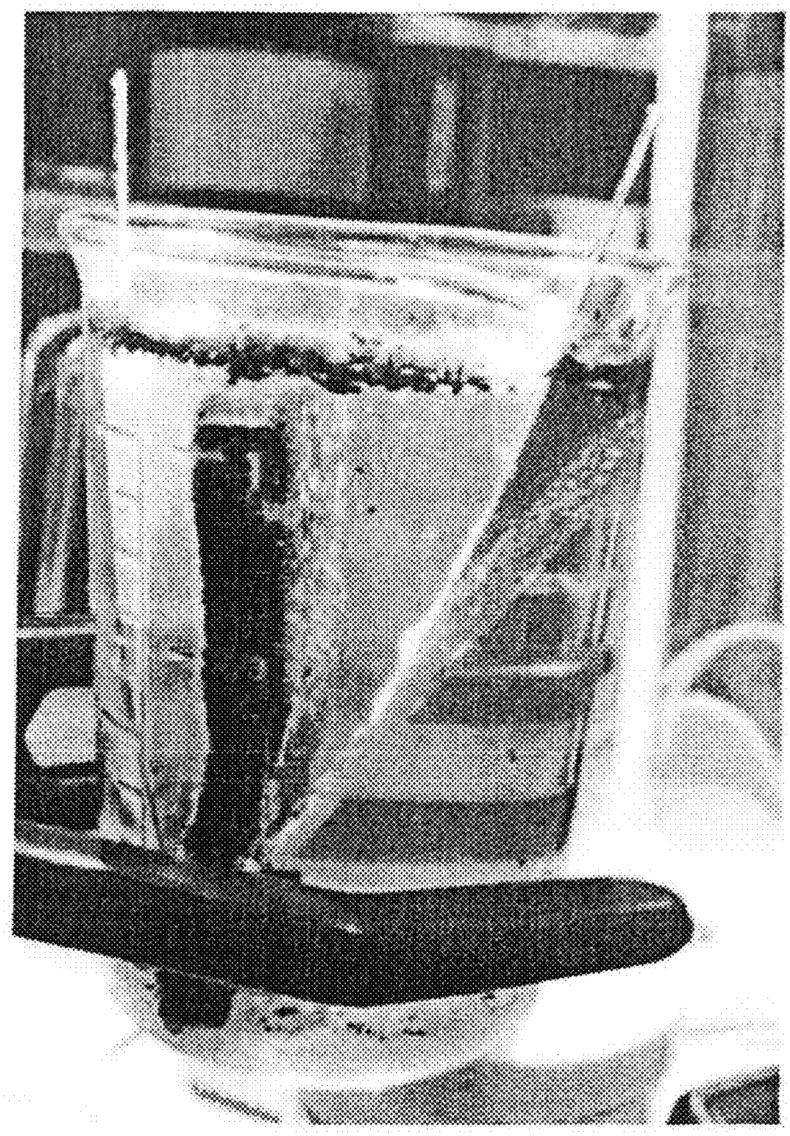
FIG. 2A is a photograph showing the hydrogen evolution state in water from the carbon electrode according to the present invention.
Figure 2B:
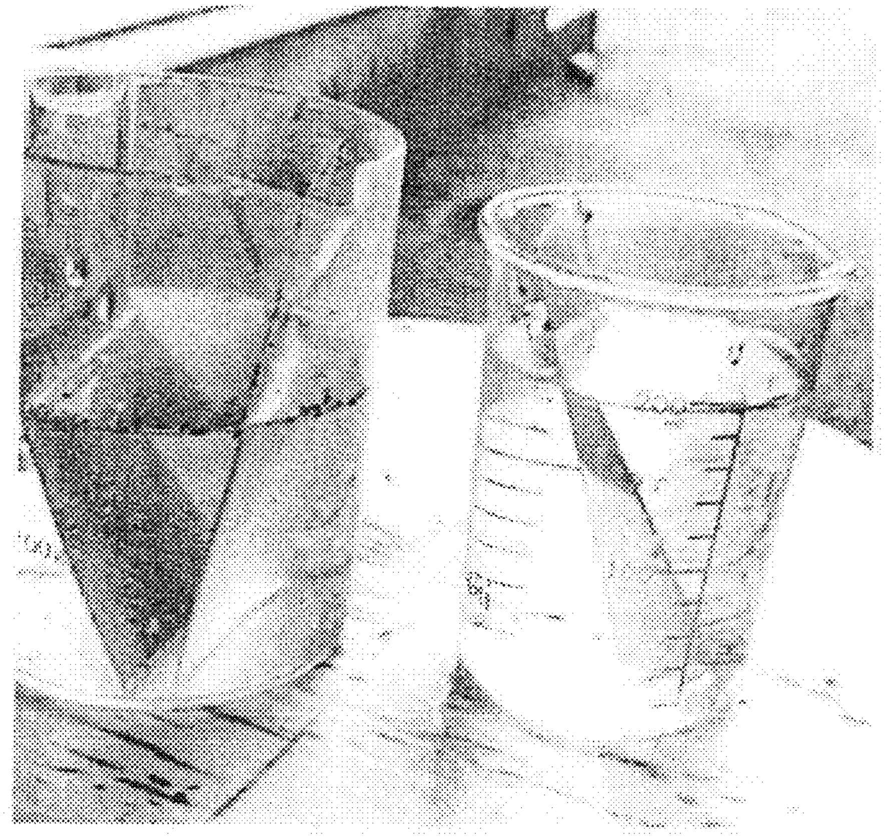
FIG. 2B is a photograph showing a hydrogen evolution state from the ethylidyne metal complex formed by ethylidyne released into water from the carbon electrode according to the present invention adheres to the electrode.
Figure 3:
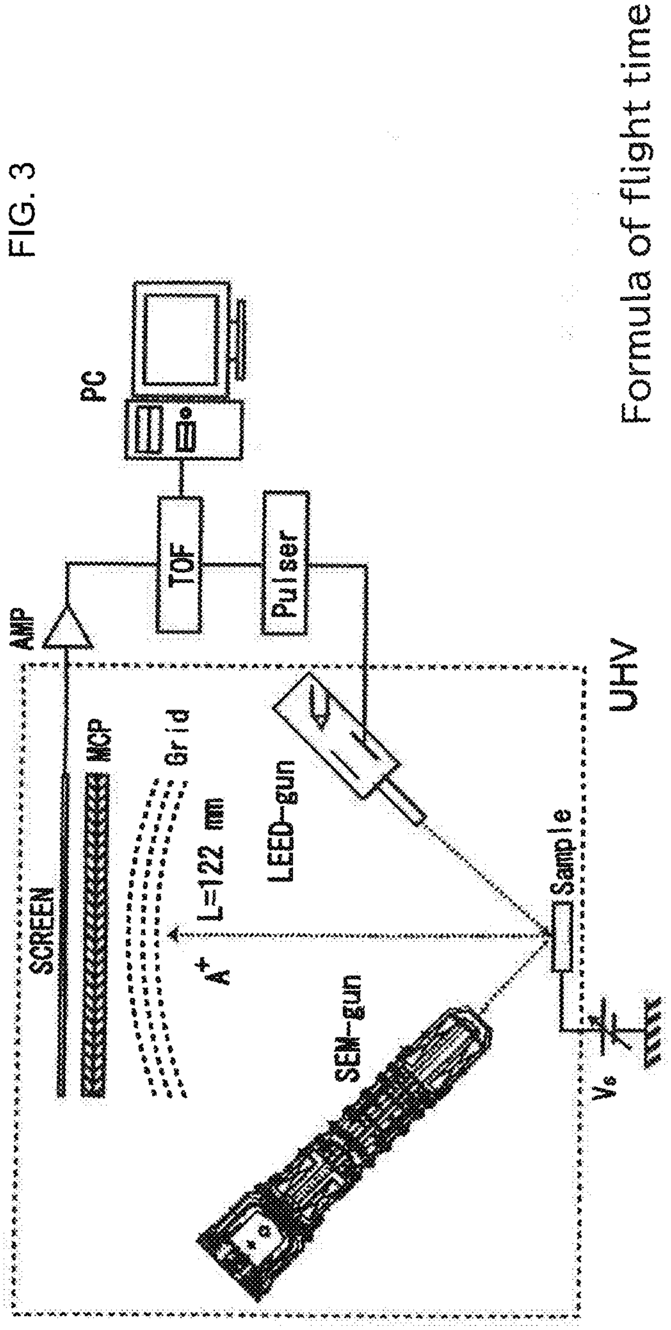
FIG. 3 is a schematic diagram of a hydrogen microscopy TOF-ESD device for detecting ethylidyne in a carbon electrode according to the present invention.
Figure 4A:
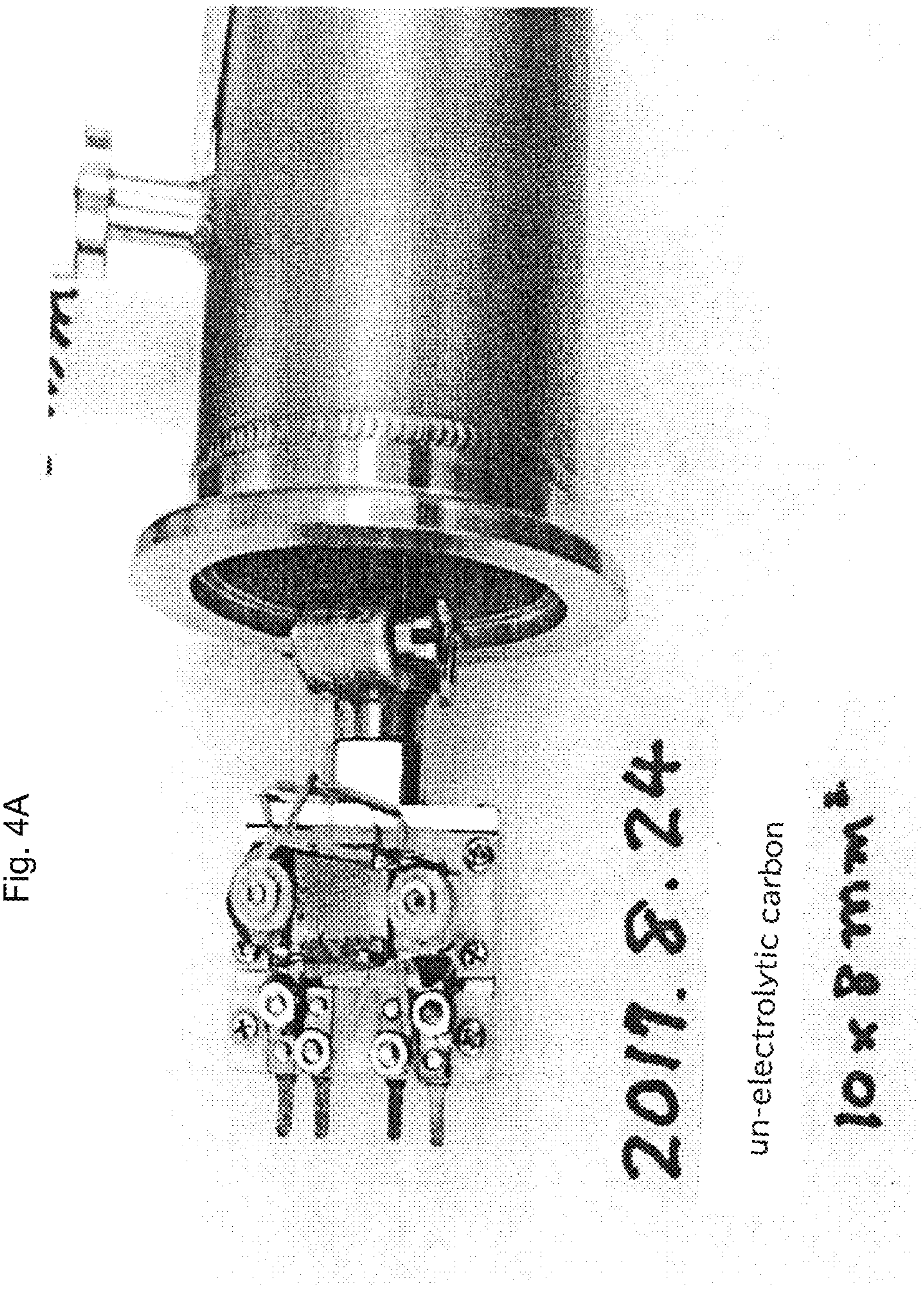
FIG. 4A is a hydrogen analysis of the unused carbon electrode sample (10 mm×8 mm), it is a photograph of a state of being set in a sample holder with a heater for heating.
Figure 4B:
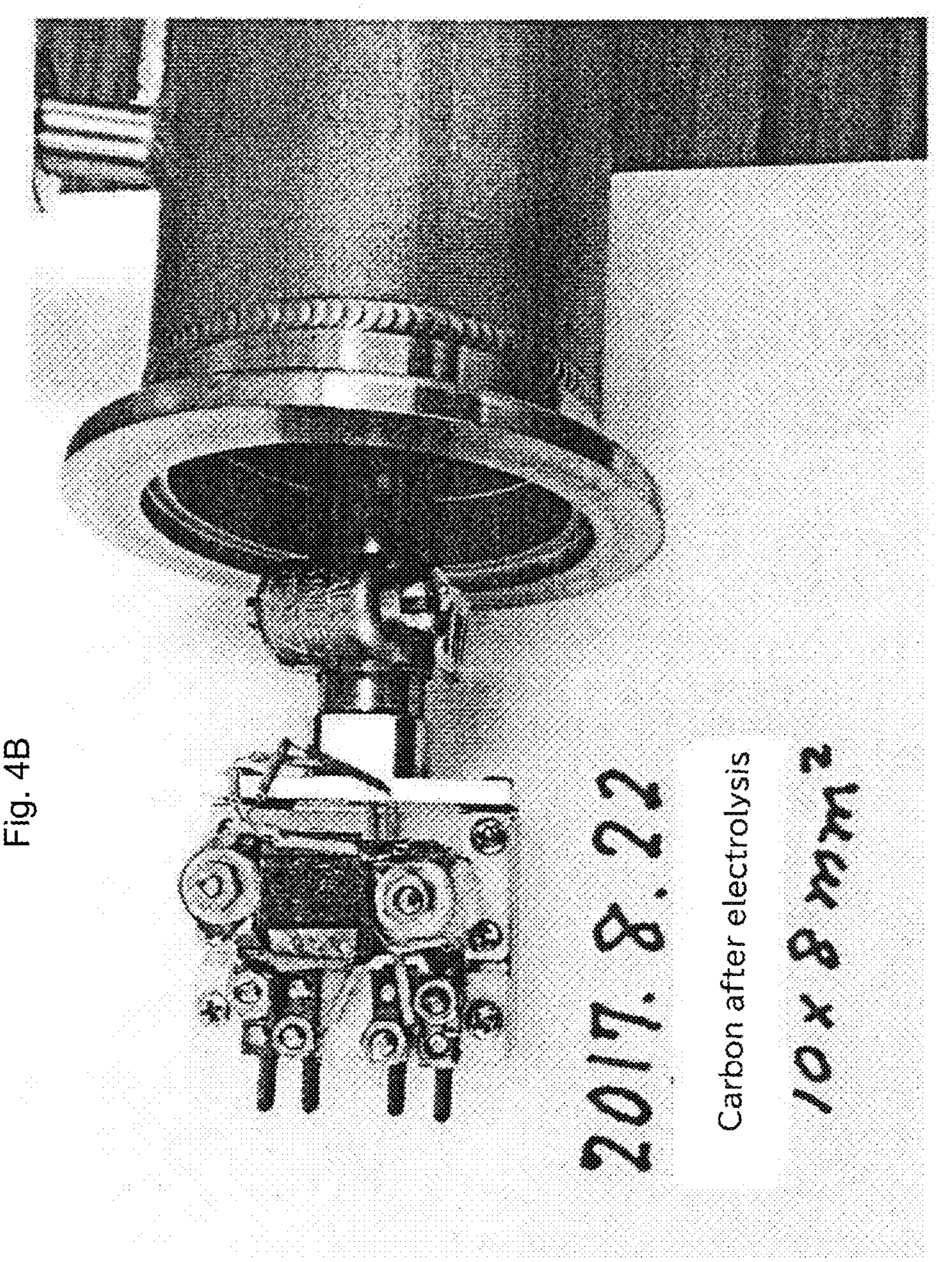
FIG. 4B is also a hydrogen analysis of the carbon electrode sample (10 mm×8 mm) after water electrolysis, it is a photograph of a state set in the sample holder with a heater for heating.
Figure 5A:
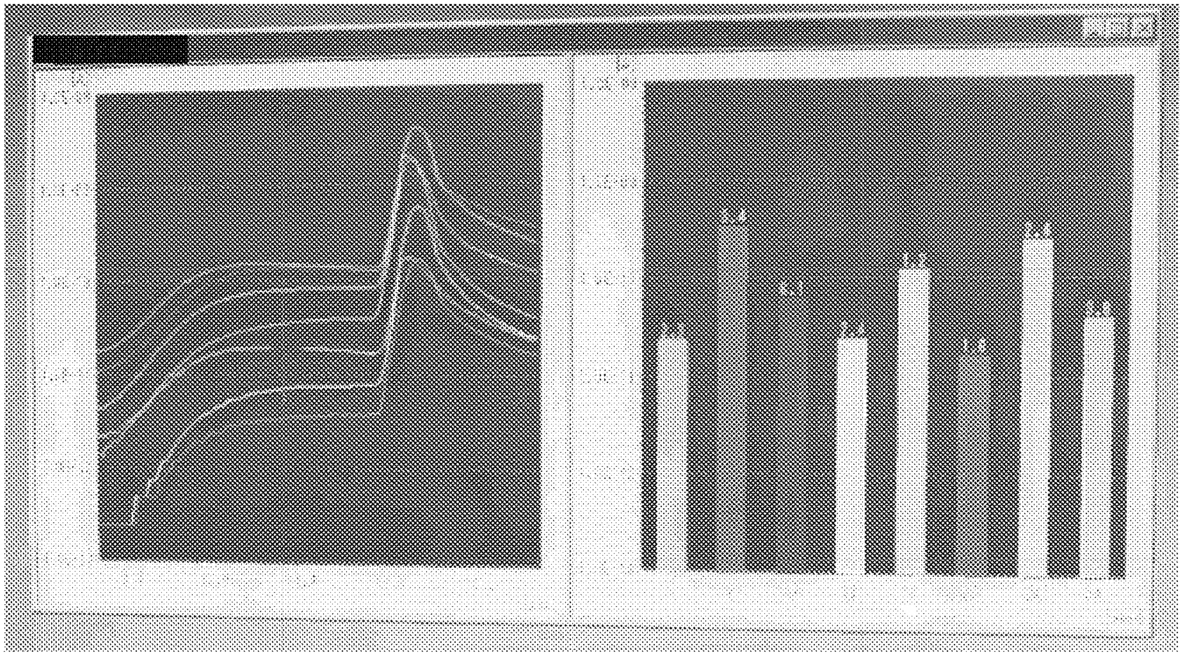
FIG. 5A shows the temperature rise desorption spectrum of impurities emitted from the sample surface into the vacuum at heating up to a sample temperature of 200° C.
Figure 5B:
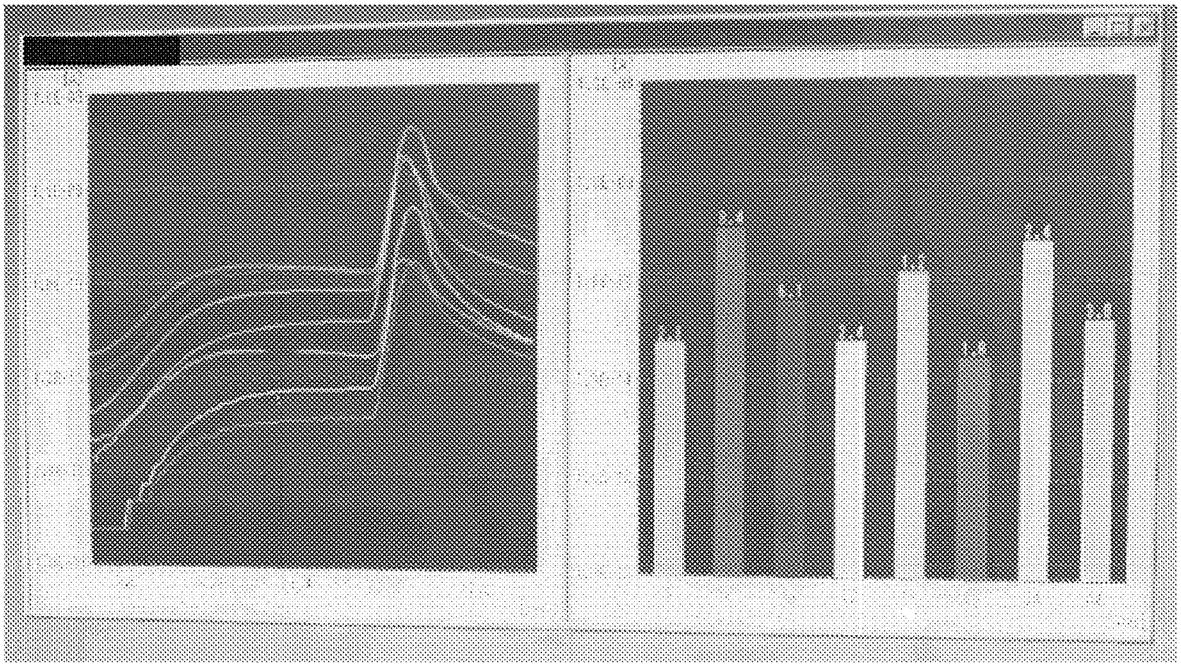
FIG. 5B shows the temperature rise desorption spectrum of impurities emitted from the sample surface into the vacuum at heating up to a sample temperature of 290° C.
Figure 6A:
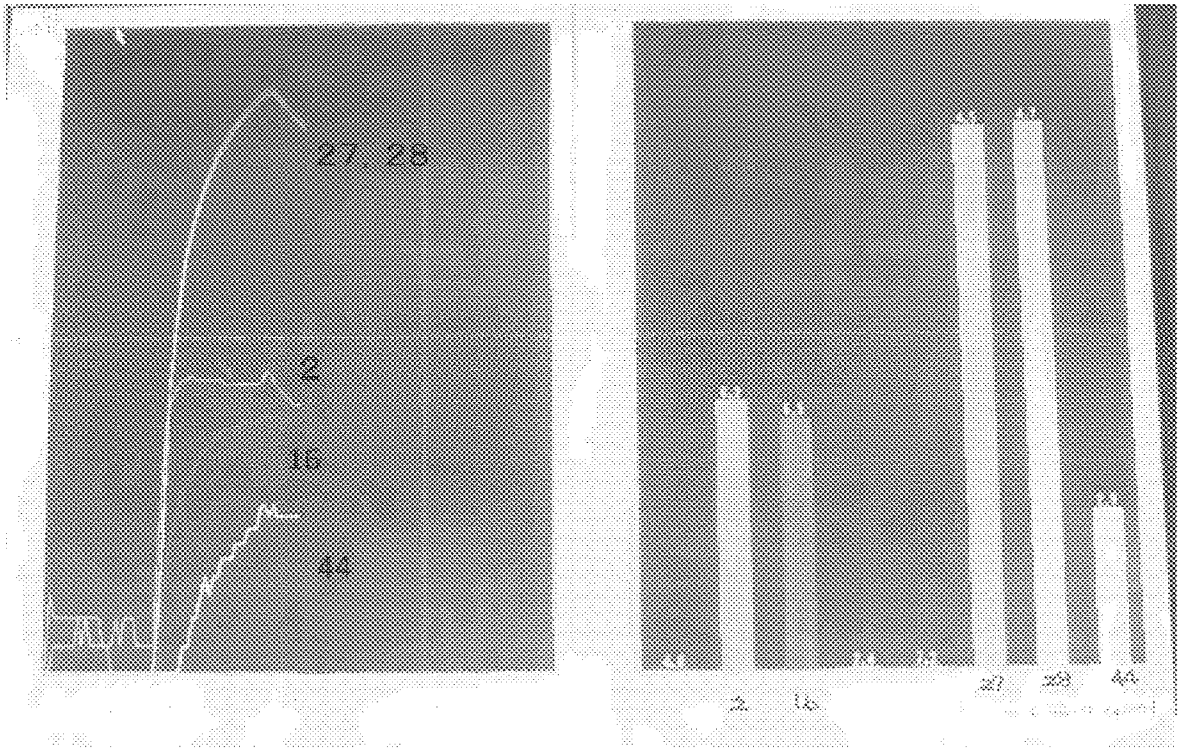
FIG. 6A shows the temperature rise desorption spectrum of the sample temperature of 290° C. wherein the test was repeated six times, and the temperature rise desorption spectrum of the third time is shown.
Figure 6B:
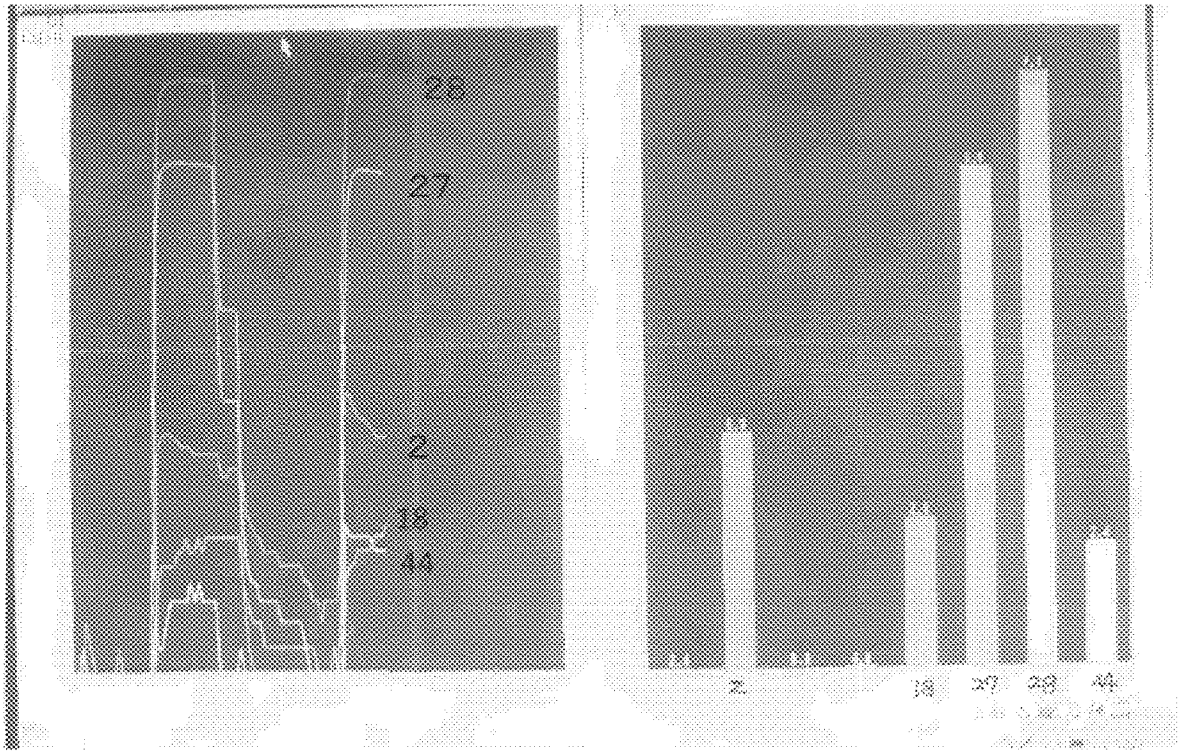
FIG. 6B shows the temperature rise desorption spectrum of the sample temperature of 290° C. wherein the test was repeated six times, and the temperature rise desorption spectrum of the fourth time is shown.
Figure 6C:
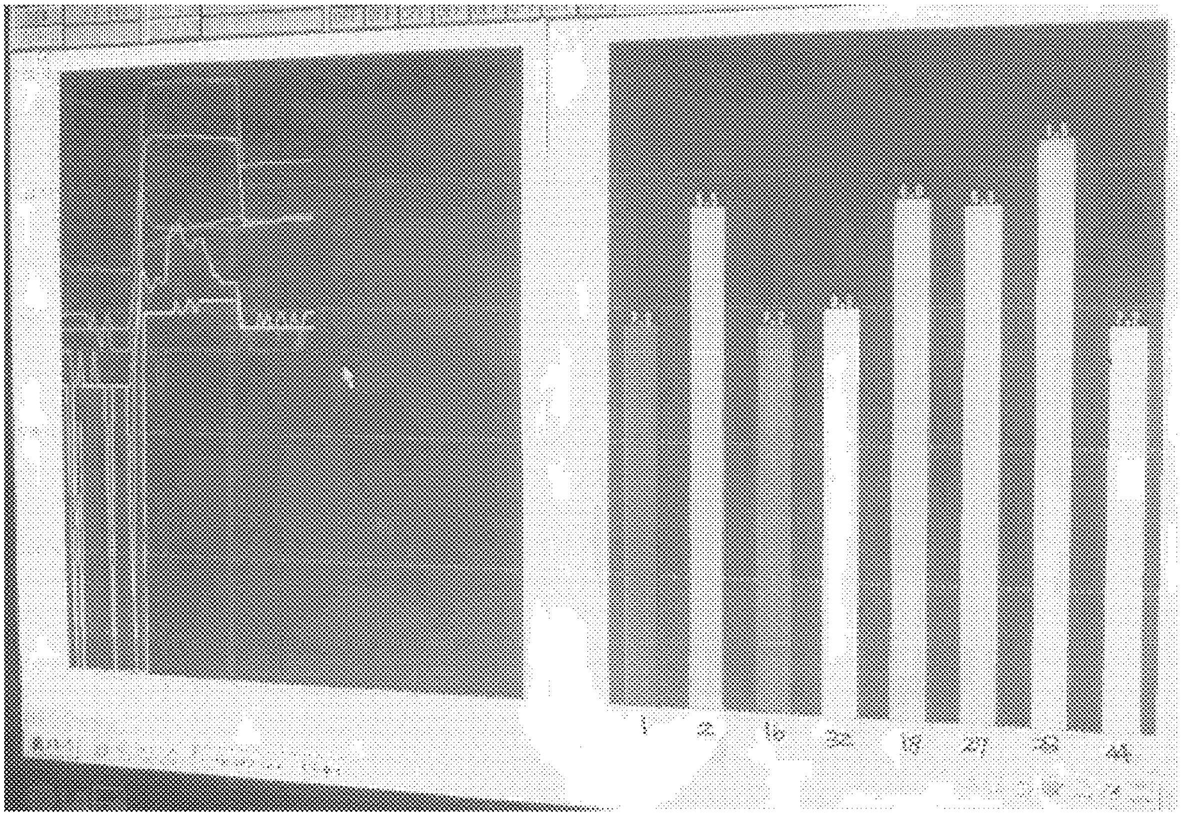
FIG. 6C shows the temperature rise desorption spectrum of the sample temperature of 290° C. wherein the test was repeated six times, and the temperature rise desorption spectrum of the sixth time is shown.
Figure 7:
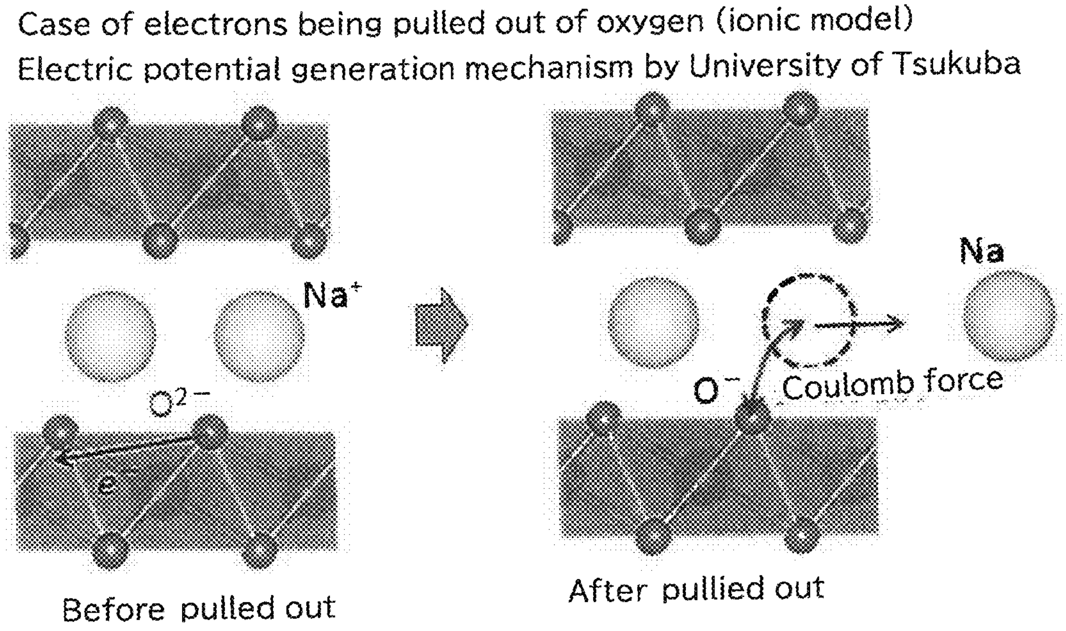
FIG. 7 shows a conceptual diagram showing a condition in which electrons are pulled out from the oxygen by $Na^+$ in the swelling FGS.

As shown in FIG. 1A, carbon electrodes 20 of 15 mm thick and 100 square cm were prepared by a process wherein a carbon plate is immersed in an aqueous solution containing 1-1.5 molar NaCl salt and 0.5-1.0 molar dextrose for 1 day and night, and subjected to a swelling treatment by a flame-irradiation on both sides and, tightened with rubber bands.

The carbon electrode 20 together with a 3 mm-thick and 100 square-centimeter aluminum plate 10 are set in a bath containing 30° C. electrolytic solution 30 comprising 1-liter water, 15-20% by volume of 50% caustic soda solution and 0.5 molar of sodium chloride.

Figure 1B:
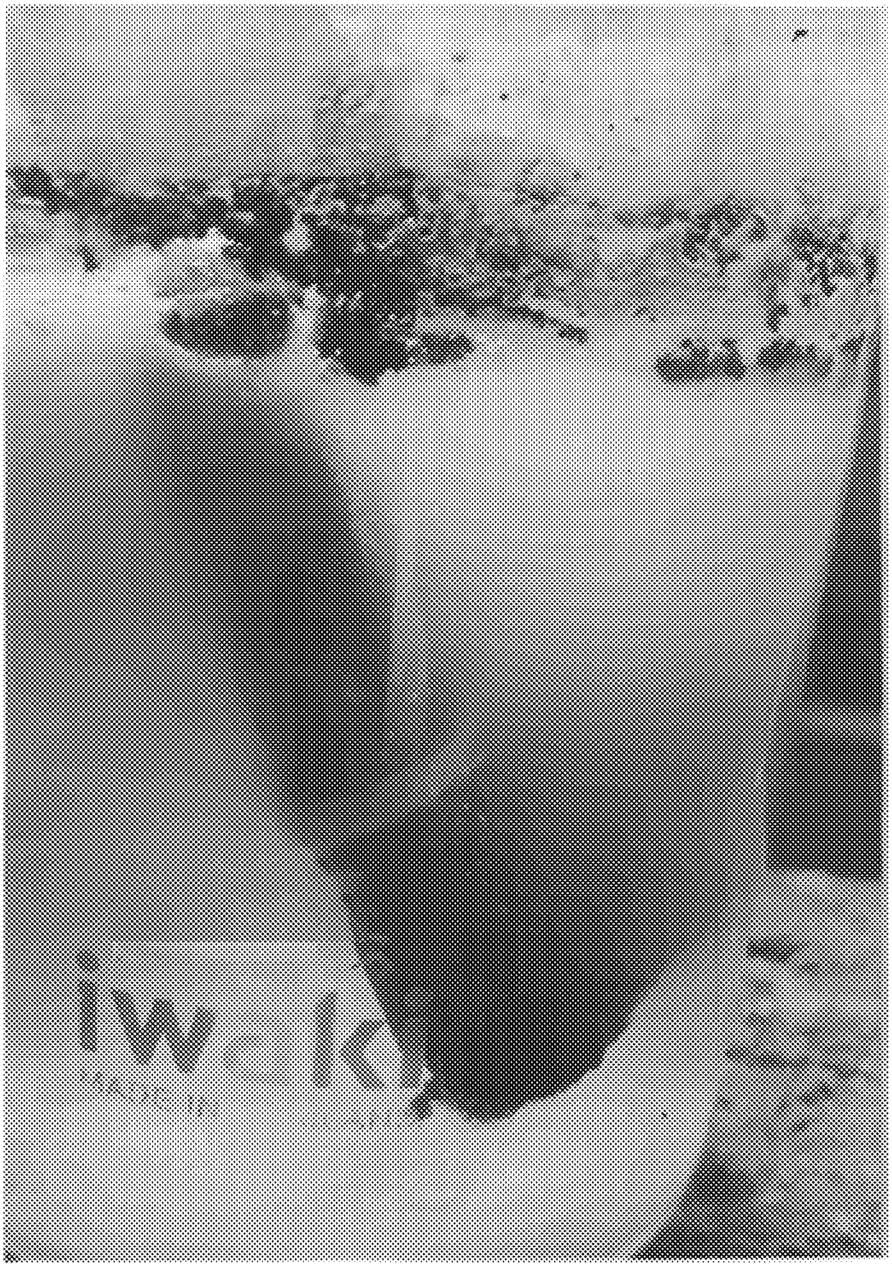
FIG. 1B is a photograph of the hydrogen generation of the hydrogen supplying system of FIG. 1A.

As hydrogen gas was evolved, heat was generated, reaching to 90° C. within 5 minutes, and the electrolytic solution reached to boiling point 106° C. immediately. The boiling was continued. Therefore, a steam together with hydrogen gas was evaporated at the open port of the electrolyte bath, so that the amount of electrolytic water was reduced quickly and violently. FIG. 1B is a photograph showing a state when the electrolytic water is boiled. Thus, it can be understood that the hydrogen gas supply system of the present invention can easily provide a large amount of hydrogen gas. In this case, a large amount of water vapor together with the hydrogen gas can collect only the hydrogen gas by collecting them in water or by cooling them.

INDUSTRIAL APPLICABILITY

According to the present invention, the hydrogen supply system comprises the carbon electrode and the metal electrode which are opposed to or in contact with each other without any external circuit. Thus, an electrolytic water such as sea water can be decomposed and hydrogen gas can be easily generated and supplied, so that it can be greatly utilized in the future hydrogen society.

DESCRIPTION OF SYMBOLS

10; Copper plate,
20; Carbon electrode,
30; 1 molar saline electrolyte

The invention claimed is:

1. A hydrogen gas supply system for generating a hydrogen gas from water by water splitting, featuring that ethylidyne is released during water splitting, comprising:

A) a carbon electrode made from a graphite having a sp2 carbon structure and a sp3 carbon structure, wherein the carbon electrode is an expanded carbon sheet made by a flame-irradiation treatment for separating and swelling graphite layers of the carbon sheet after immersing in nitric acid as the oxidizing agent to have a specific gravity of 0.1 to 0.5 $g/cm^3$ and a carbon-oxygen atom ratio of approximately 1 to 1, B) an alkaline electrolyte water solution containing caustic soda solution and NaCl, and C) a metal electrode capable to be ionized in the alkaline electrolyte water solution and comprising aluminum, wherein the carbon electrode and the metal electrode are not connected with any external circuit, and wherein the hydrogen gas is generated due to water splitting by a redox reaction in the alkaline electrolyte water solution, and detection of ethylidyne by means of TOF-ESD (time-of-flight electron-excited ion desorption) microscopy is a property of the expanded carbon sheet after the redox reaction.

2. The hydrogen gas supply system according to claim 1, wherein the alkaline electrolyte water solution is configured by adding 5 to 30 volume % of a 50% caustic soda solution to an electrolyte water solution.

3. The hydrogen gas supply system according to claim 2, wherein a sea water is used as the electrolyte water solution.

* * * * *